June 2, 1953 J. L. CLOUDSLEY 2,640,564
FLUID PRESSURE RELIEVING APPARATUS
Filed June 9, 1951 3 Sheets-Sheet 1

John Leslie Cloudsley
Inventor

By *Mukroth,*
*Sint & Womack*
Attorneys

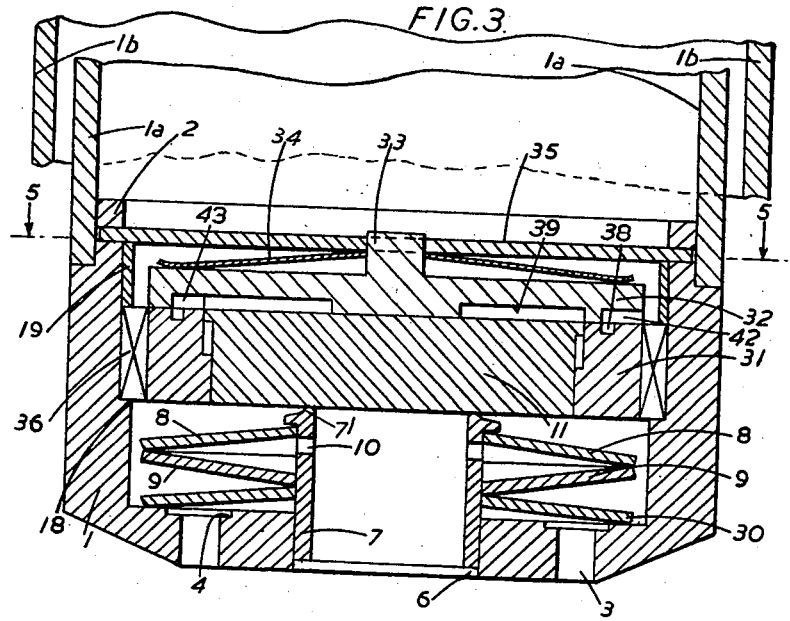
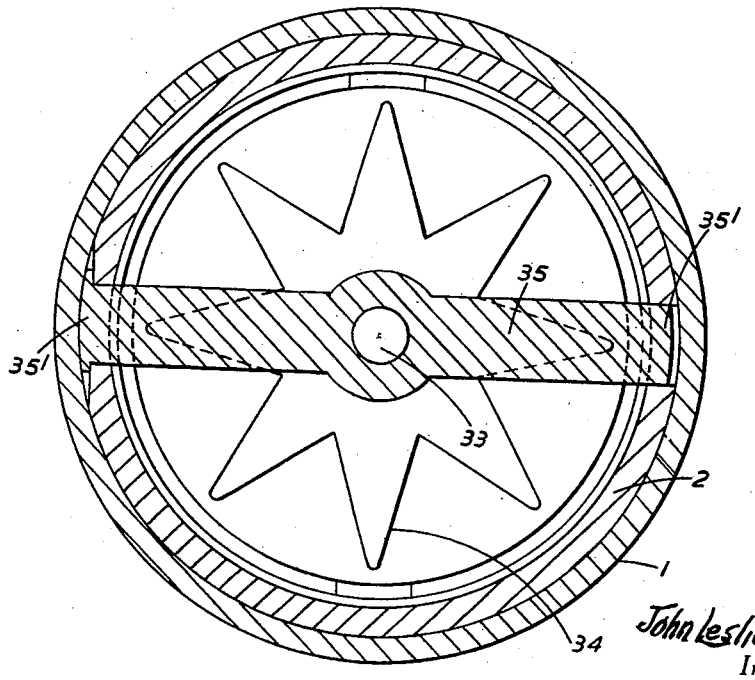

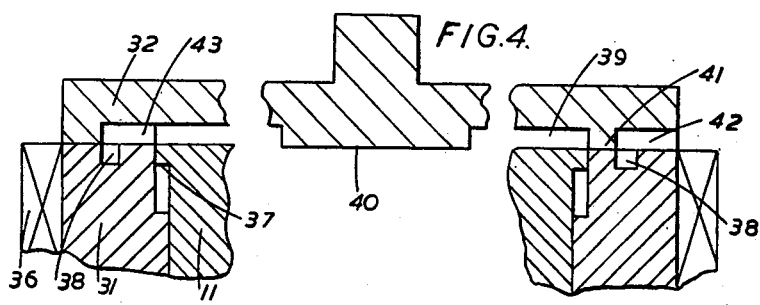
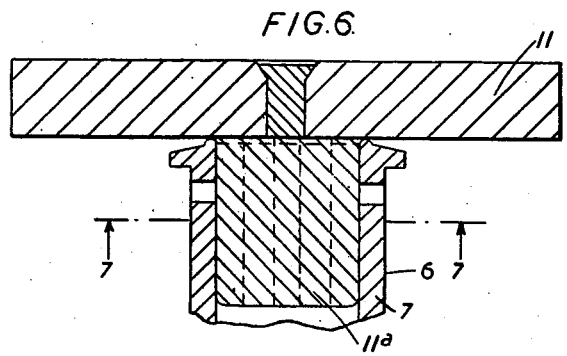
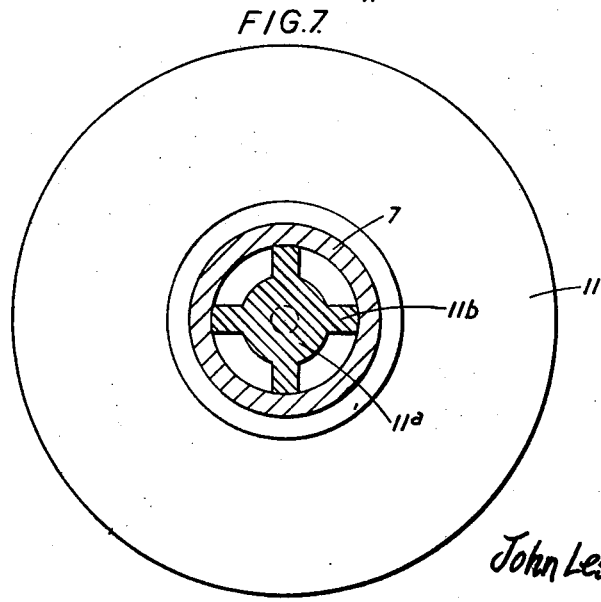

Patented June 2, 1953

2,640,564

UNITED STATES PATENT OFFICE 2,640,564

FLUID PRESSURE RELIEVING APPARATUS

John Leslie Cloudsley, Radnage, England

Application June 9, 1951, Serial No. 230,753
In Great Britain March 26, 1947

9 Claims. (Cl. 188—100)

This invention relates to fluid pressure relieving apparatus and has particular reference to shock-absorbers of the kind in which the desired shock absorbing effect is obtained by resistance set up by restricting the circulation of fluid such as oil from one side of a damping piston to the other side thereof.

A particular form of pressure relieving device of the above stated kind is described and illustrated in the specification of my U. S. A. Patent No. 2,521,202. In the specification of that patent I described a shock-absorbing piston and associated valve and dashpot unit comprising a plurality of flat steel washers or annular laminae forming a laminar valve. This valve bears near its periphery against an annular seat formed inside the piston and bears near its central aperture against a valve bearing member away from which it becomes deflected for the passage of oil from one side of the piston to the other when the piston performs its pressure stroke. Attached to the valve bearing member is a diaphragm forming one wall of a hydraulic dashpot chamber. Oil under pressure deflects the laminar valve away from the valve bearing member as already stated, and oil entering the dashpot chamber causes the diaphragm wall thereof to advance and carry with it the valve bearing member attached thereto in a follow-up movement with respect to the laminar valve.

In practice a laminar valve made up of flat annular laminae is not the most suitable form of valve to use owing to the tendency of the laminae to deform and become fatigued should they become over-deflected. Also the degree of deflection of such laminae permitted within their safeload stressing is small and this in turn makes the control of the flow of oil into the dashpot very sensitive. Moreover, if oil finds its way between the laminae of the assembly thereof they tend to buckle and render control indeterminate. To obviate these disadvantages of an assembly of flat laminae, one or more resilient frusto-conical annular discs or washers, preferably in pairs placed rim to rim, may be used, or a group of three such washers may be used as hereinafter described.

A piston and associated valve and dashpot assembly of the kind above referred to is advantageously used in telescopic-type shock absorbers in which the assembly functions as a piston movable to and fro along the cylindrical portion or casing of the telescopic construction. It will be understood that if, in such a construction, the piston assembly is secured to the lower end of a piston rod passing through a gland at the upper end of the cylinder, the volume of liquid displaced backwardly through the piston during its forward stroke is greater than the space available behind the piston because the piston rod itself occupies space; consequently the remainder of the displaced liquid must flow elsewhere, and in a known type of telescopic shock absorber the cylinder is double-walled with a space between the walls to serve as a liquid reservoir into which the aforesaid remainder liquid passes during the forward stroke of the piston and from which it returns during the rearward stroke. In such an arrangement a valve and dashpot assembly similar to that used in the piston itself is used at the base of the cylinder proper or inner wall where it leads into the reservoir space.

The present invention is concerned with an improved and simplified arrangement of parts for producing the dashpot or time-lag effect in the valve and dashpot assembly, whether used in the piston itself, or in the so-called base assembly located between the base or far end of the cylinder proper and the adjacent end of the surrounding cup-shaped jacket or second wall enclosing the reservoir space.

The present invention provides fluid pressure relieving apparatus, particularly for use in hydraulic shock absorbers, of the kind in which the flow of fluid through a piston reciprocating in a cylinder, or through the base assembly of a piston and cylinder arrangement as hereinbefore described, is controlled by a valve which, when displaced from its seat, is followed up, after suitable delay, by said seat and is characterised by the fact that flow of fluid from the cylinder to the hydraulic follow-up means takes place by travel in opposite directions along two halves of a narrow circular track from an entry port thereto to a diametrically opposite exit port so that the two streams meet opposingly at the latter port.

The invention will now be described with reference to certain embodiments thereof as illustrated in the accompanying drawings, in which—

Figure 3 is a view similar to Figure 1 illustrating a modified form of the base assembly.

Figure 4 is an enlargement of a part of Figure 3.

Figure 5 is a horizontal section on the line 5—5 of Figure 3.

Figure 6 is an enlarged sectional view of a modified form of one of the elements of the construction of Figure 3.

Figure 7 is a horizontal section on the line 7—7 of Figure 6.

Figure 1:
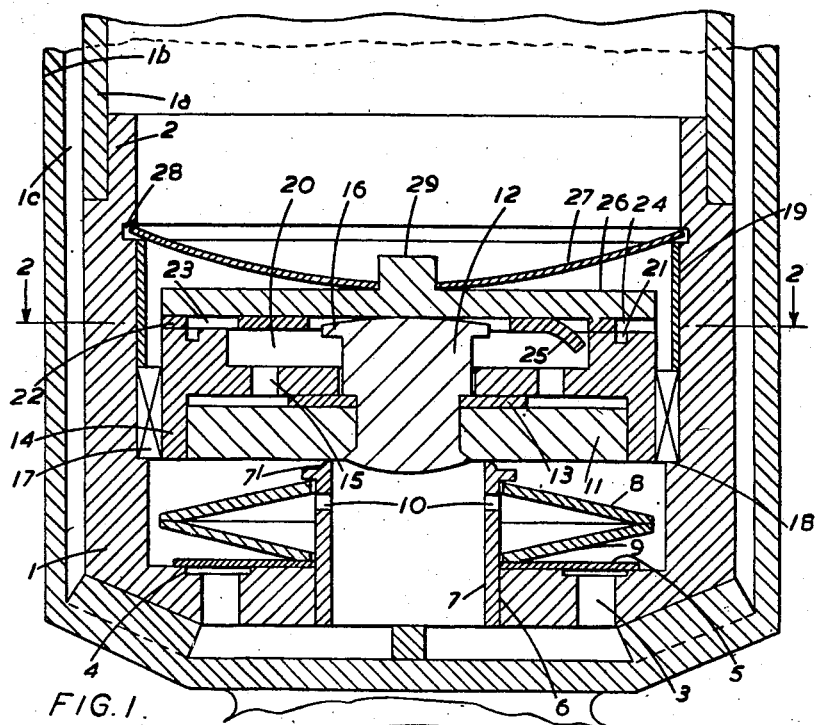
Figure 1 illustrates the invention as applied to the base assembly of a liquid shock-absorber of the telescopic type in which the liquid passes through the assembly between the cylinder proper, or inner cylinder, when the piston therein (not shown) moves, and a supplementary or outer cylinder spaced therefrom and forming a liquid reservoir.
Figure 2:
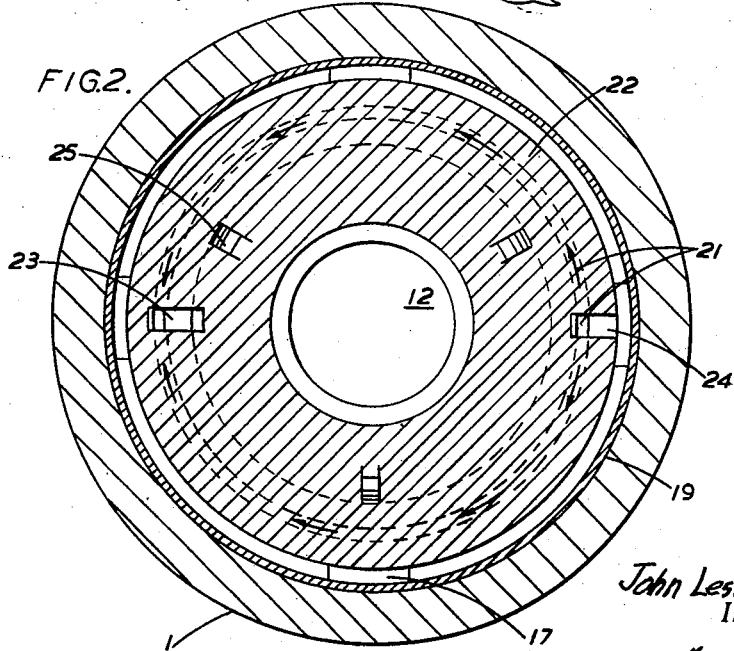
Figure 2 is a horizontal section on the line 2—2 of Figure 1.

Referring first to the construction illustrated by Figures 1 and 2, the reference numeral 1 indicates the cup-shaped body portion of the base assembly of a telescopic hydraulic shock-absorber comprising an inner oil-charged cylinder 1a (in which a piston rod and piston, not shown, move) and a concentric outer cylinder 1b between which and the inner cylinder is the annular space 1c constituting a reservoir for the liquid (oil) displaced from the inner cylinder when the piston moves down. The bottom of the body portion 1 rests on spacing blocks or studs on the closed end of the outer cylinder 1b. The top end or rim of the body portion 1 is formed with a spigot 2 to make a push-fit connection with the lower end of the inner cylinder 1a. In the bottom of the body 1 are several holes 3 which are evenly displaced radially with respect to the axis of the body. A shallow circumferential groove 4 interconnects the holes 3 beneath a flexible plate 5 which bears upon the flat inside surface of the bottom of the body 1 so as to seal them. The bore of an axial hole 6 in body 1 serves to guide a hollow cylindrical valve 7, the top of which is flanged to bear upon the upper disc 8 of a pair of resilient frusto-conical annular disc springs 8 and 9 the upper one of which tends to push the cylindrical valve upwards whilst the lower one bears upon the flexible plate 5. Ports 10 connect the space between the discs 8 and 9 and the inside of the valve 7. On the flanged top of part 7 is formed a rim 7' which forms an oil seal with the underside of a valve seating member 11 in the form of a piston mounted in a cylindrical recess on the underside of a dashpot member 14. The faces of the disc springs 8 and 9 are ground to form two oil seals one where the spring 8 contacts the underside of the flange on the valve 7 and the other where the spring 9 contacts the top side of the flexible plate 5. The valve seating member 11 is mounted on a rod 12 which may be screwed into it or riveted at its lower end as shown. A spacing washer 13 limits the upward movement of the piston 11 in the recess in the member 14. Holes 15 serve for the passage of oil into and out of the space between the member and the top of the piston member 11. The top of the rod 12 is formed with a flange 16 which serves to determine the downward movement of the rod and the piston member 11. Guides 17 (of which there may be three or four) on member 14 serve to position the latter radially in the body 1, these guides bearing on the one hand against a shoulder 18 in the body 1 and on the other hand against a cylindrical ring 19. The top end of the member 14 is bored out to form a space 20.

The top of the member 14 which is faced smoothly to form an oil seal with a metering plate 22 has a circumferential groove 21 turned in it which is covered by the metering plate 22 except for the ports 23 and 24 (see also Figure 2). Three bent down strips of plate 22, one of which is shown at 25 locate the plate radially. A cover plate 26 is faced smoothly on its lower surface to form an oil seal with the plate 22. A spring strip 27 is sprung into a groove 28 in the body 1 and bears downwards on the cylindrical ring 19 so as to cause the guides 17 of the member 14 to bear against the shoulder 18 of the body 1. The spring strip 27 also fits over a spigot 29 on plate 26 so as to locate the latter radially and cause it to bear upon the metering plate 22.

The parts 11, 12, 13, 14, 22 and 26 function as a dashpot as hereinafter explained.

The device above described functions as follows: On the piston proper (not shown) moving downwards in the shock-absorber cylinder 1a (pressure stroke), oil passes downwards into the base assembly around the dashpot member 14 by way of the passages between the guides 17 to bear against the top of the flexible valve plate 5, thus sealing the holes 3. The oil at the same time bears upon the outside of the disc springs 8 and 9 and upon the top face of the flange 7' on the valve 7 and forces the latter downwards and deflects the springs 8 and 9 towards each other thereby displacing the oil between them through ports 10. In fact the cylindrical valve member 7 in combination with the springs 8 and 9 function as a spring controlled valve unit. As the valve 7 moves downwards away from its seat on the valve-seating piston member 11, oil passes through the central bore of part 7 and out of the assembly to the reservoir 1c. At the same time oil will have been entering the port 24 to pass into the circumferential groove 21 where it divides into two streams passing in opposite directions to meet at the diametrically opposite port 23 in the metering plate 22 through which it passes to the space 20 and by way of the holes 15 into the space above the piston member 11. Then as described in my U. S. A. patent specification No. 2,521,202 owing to the differential pressure existing between the top and bottom surfaces of the rod 12, both the rod 12 and the piston 11 move downwards to follow up the downward movement of the part 7 as the disc springs 8 and 9 deflect towards each other. It will be seen that the rate at which the movable valve-seating member 11 and the rod 12 can be displaced downwards is dependent upon the rate at which oil can enter the dashpot spaces by way of the ports 24 and 23 and the long circumferential groove 21. I find that control of the passage of oil into the dashpot spaces by this means is not unduly sensitive, and that the choking effect where the two semi-annular streams of oil entering the groove 21 at the port 24 meet at the port 23 has a restraining effect upon the rate of flow, so that relatively larger passages and ports may be employed which are less likely to choke than a mere spiral passage and present no manufacturing difficulties, and the controlled follow-up effect described and claimed in my U. S. A. Patent No. 2,521,202 is more effectively achieved.

On the piston proper (not shown) moving in the reverse direction, i. e. upwards in the cylinder 1a, oil will pass in the reverse direction through the base assembly illustrated in Fig. 1. The flexible valve plate 5 will be deflected upwards to uncover the holes 3, thus allowing oil to pass readily from the reservoir 1c and through the assembly by way of the spaces between the guides 17. At the same time the disc springs 8 and 9 reassert themselves, pushing upwards the movable valve member constituted by the rod 12 and piston member 11, and owing to the relatively large area of the annular space 20, plate 26 is raised against spring 27 sufficiently to permit of the rapid displacement of oil from the dashpot and the return of the movable valve member to its top-most position.

The ports 24 and 23 could be cut in the dashpot member 14 and be satisfactory from the point of view of functioning, but I prefer to use a separate interchangeable metering plate such as 22, for if a change in the rate of follow-up is desired, the size of the ports 23 and 24 requires to be altered, and I therefore provide interchangeable metering plates 22 of different thicknesses and/or having ports 23 and 24 of different arcuate size.

Instead of the flat port-sealing plate 5 of Figure 1 it is advantageous to use for the same purpose a frusto-conical annular spring disc as shown at 30 in Figure 3. Such a spring disc may be used alone instead of the pair of springs 8, 9 and flat plate 5, but it is preferably used in conjunction with the pair of springs 8, 9, instead of flat plate 5, because the use of such a disc of deflection strength or "rate" greater than that of the pair of springs in assembly therewith introduces a two-stage control in the degree of opening below the underside of the piston member 11. With only a pair of spring discs as shown in Figure 1 the limit of the aforesaid opening is reached when the discs collapse or shut up, whereas with the third disc there is still a degree of control after the collapse of the pair. This second stage of control constitutes a high pressure relief for the oil.

Further, the use of the third spring disc 30 as above described permits a longer stroke movement of the valve 7 and of the dash pot piston 11. To provide for this additional movement the construction of Figure 1 is somewhat modified as shown in Figure 3. Instead of making a mere cylindrical recess in the dashpot body 14 the latter is bored from face to face forming a cylinder 31 in which the dashpot piston 11 works. The top of the cylinder 31 is covered by a cover plate 32. The centre portion of the plate 32 is formed on its top face with a centering pin 33 over which fits a star spring 34 and a holding-down or reaction cross-bar 35, the ends 35' of which are housed in recesses near the top rim of the body 1 as shown more clearly in Figure 5 where it will also be seen that the cross-bar 35 can be slid into position by a diametrical movement from right to left. The star spring 34 presses the cover plate 32 against the top rim of the cylinder 31. The dashpot cylinder 31 is formed (like the dashpot member 14 of Figure 1) with guide fins 36 bearing on the shoulder 18 and is held down on the shoulder by the spacing ring 19.

The top edge of the dashpot piston 11 is formed with a rim flange 37 (Figure 4) and the interior of the cylinder 31 is formed at its upper portion with an enlargement to allow the rim flange 37 on the piston 11 to travel within limits. The top face of the cylinder 31 is formed with an annular channel or groove 38, and the undersurface of the cover plate 32 is formed with a facial annular recess 39 leaving a centre face 40 and a circumferential wall 41 in the same plane as one another, so that the face 40 bears against the top of the piston 11, when the latter is at the top of its stroke, whilst the wall 41 bears against the top face of the cylinder 31. Cut in the circumferential wall 41 is a radial groove or port 42 leading from outside the cover plate 32 down into the circular channel or groove 38. Diametrically opposite to the radial groove or port 42 is a second radial groove or port 43 leading from the circular groove 38 inwards to the facial annular recess 39. It will be appreciated that oil travels between the grooves or ports 42 and 43 in semi-circular paths along the channel or groove 38 and in opposite directions, similarly to the travel in the groove 21 of the construction shown in Figure 1.

The construction of Figures 3, 4 and 5 functions as follows: When the piston (not shown) inside the inner cylinder of the shock absorber moves downwards (pressure stroke), the pressure of oil passing down past the outside of the cylinder 31 bears upon the spring discs 8, 9 and 30 deflecting them downwards and preventing the passage of oil through the holes 3. At the same time the pressure of oil bearing upon the flanged top of the valve 7 causes it to move downwards through the axial hole 6 in the body 1. As the valve 7 moves downwards the rim 7' at its top end moves away from the underside of the piston 11 so that oil can pass down the interior of the valve 7. At the same time oil will be passing by way of the radial groove 42, the annular passage 38, and the radial groove 43, into the recess 39 and the interior of the dashpot cylinder 31 onto the top of the piston 11 and because of the differential pressure prevailing as between the underside of the piston 11 and its top side, the piston will move downwards, following up the movement of the valve 7 until the flanged rim 37 meets the shoulder inside the cylinder 31. It will be appreciated that owing to the relatively small sectional areas of the radial grooves 42 and 43 and the annular groove 38, the degree to which the piston moves downwards will be a function of the speed of the stroke. When the piston (not shown) in the shock-absorber inner cylinder 1a moves downwards, the spring discs 8, 9 and 30 will reassert themselves, thereby pushing the piston 11 upwards in its cylinder 31, and the pressure of oil generated by this upward movement will cause the dashpot cover plate 32 to be lifted against the resistance of the star spring 34, thus allowing the oil on the top side of the piston 11 to escape quickly all round the top rim of the cylinder. Incidentally, this flow of oil across the top face of the cylinder 31 prevents the accumulation of foreign matter in the groove 38 and ports 42 and 43. At the same time oil passing through the holes 3 in the body 1 will bear against the underside of the spring disc 30 and will lift the discs 30, 9 and 8 and the part 7, the piston 11 and the cover plate 32 against the star spring 34, and the oil itself will pass upwards past the edge of the spring disc 30 and further upwards between the guides 36 on the cylinder 31 back into the inner cylinder 1a.

It will be appreciated that the presence of the stiff spring disc 30 as well as the pair of discs 8 and 9 affords a two-stage control of movement, one consequent upon the shutting up of the springs 8 and 9, and the other consequent upon deflection of the stiff spring 30 as already described.

Figures 6 and 7 illustrate a preferred arrangement for ensuring alignment of movement of the piston 11 in its cylinder 31. As seen, the piston 11 is provided with a stem 11a having longitudinal ribs 11b for sliding engagement with the internal wall of the tubular part 7.

What I claim is:

1. Fluid-pressure-relieving apparatus for use in shock absorbers and similar equipment, comprising a cylinder, a piston slidable therein and having a through-passage for the flow of liquid to opposite sides of said piston, a valve, a liquid dashpot device the movable element of which serves as a valve seat for said valve, and means for resiliently pressing said valve against its seat and including a member constituting part of said device and formed with a narrow circular track whereby the flow of liquid into the dashpot device from the cylinder when the piston moves takes place by travel from an entry port in opposite directions along the two halves of said narrow circular track to a diametrically opposite exit port so that the two streams meet opposingly at the latter port.

2. Fluid-pressure-relieving apparatus for use in shock absorbers and similar equipment, comprising a cylinder, a piston slidable therein and having a through-passage for the flow of liquid to opposite sides of said piston, a valve, a liquid dashpot device the movable element of which serves as a valve seat for said valve, and means for resiliently pressing said valve against its seat and including a member constituting part of said device and formed with a narrow circular track whereby the flow of liquid into the dashpot device from the cylinder when the piston moves takes place by travel from an entry port in opposite directions along the two halves of said narrow circular track to a diametrically opposite exit port so that the two streams meet opposingly at the latter port, the said circular track being constituted by a circular channel formed on one face of the said track-providing member, which is cylindrical, and the said entry and exit ports being constituted by slots in a metering plate which overlies the channelled face of said track-providing member, and the combination including a cover plate bearing upon the said metering plate.

3. Fluid-pressure-relieving apparatus according to claim 2, the said ported metering plate constituting any one of a set of interchangeable plates of different thicknesses.

4. Fluid-pressure-relieving apparatus according to claim 2, the said ported metering plate constituting any one of a set of interchangeable plates having ports of different size.

5. Fluid-pressure-relieving apparatus for use in shock absorbers and similar equipment, comprising a cylinder, a piston slidable therein and having a through-passage for the flow of liquid to opposite sides of said piston, a valve, a liquid dashpot device the movable element of which serves as a valve seat for said valve, and means for resiliently pressing said valve against its seat and including a member constituting part of said device and formed with a narrow circular track whereby the flow of liquid into the dashpot device from the cylinder when the piston moves takes place by travel from an entry port in opposite directions along the two halves of said narrow circular track to a diametrically opposite exit port so that the two streams meet opposingly at the latter port, and the said circular track being constituted by a circular channel formed on one face of the said track-providing member, which is cylindrical, and the said entry and exit ports being formed on the underside of a cover plate extending over the said face.

6. Fluid-pressure-relieving apparatus according to claim 1, wherein the means for resiliently pressing the valve against its seating member consists of at least one frusto-conical annular disc of resiliently deformable material having its inner periphery bearing against said member.

7. Fluid-pressure-relieving apparatus according to claim 1, wherein the means for resiliently pressing the valve against its seating member consists of a pair of frusto-conical annular discs of resiliently deformable material having their outer peripheries in contact with one another.

8. Fluid-pressure-relieving apparatus according to claim 1, wherein the means for resiliently pressing the valve against its seating member consists of a co-axial assembly of frusto-conical annular discs of resiliently deformable material differing in stiffness or "rate" and so arranged that when one or more of the assembly becomes incapable of further effect, at least one remaining disc is still able to function.

9. Fluid-pressure-relieving apparatus according to claim 1, wherein the means for resiliently pressing the valve against its seating member consists of a co-axial assembly of three frusto-conical annular discs of resiliently deformable material, two of the three discs being of the same strength and arranged face to face with their outer peripheries in contact with one another, and the third disc being arranged back to the pair and of greater strength.

JOHN LESLIE CLOUDSLEY.

References Cited in the file of this patent

UNITED STATES PATENTS

| Number | Name | Date |
|---|---|---|
| 2,148,839 | Bossman et al. | Feb. 28, 1939 |
| 2,225,986 | Glezen | Dec. 24, 1940 |
| 2,296,732 | Oyston et al. | Sept. 22, 1942 |
| 2,431,966 | Rossman | Dec. 2, 1947 |
| 2,501,121 | Caserta | Mar. 21, 1950 |
| 2,569,520 | Funkhouser et al. | Oct. 2, 1951 |